Oct. 18, 1966  M. KEMENCZKY  3,279,178
HYDRODYNAMIC VALVE STRUCTURE
Filed April 16, 1963  3 Sheets-Sheet 1
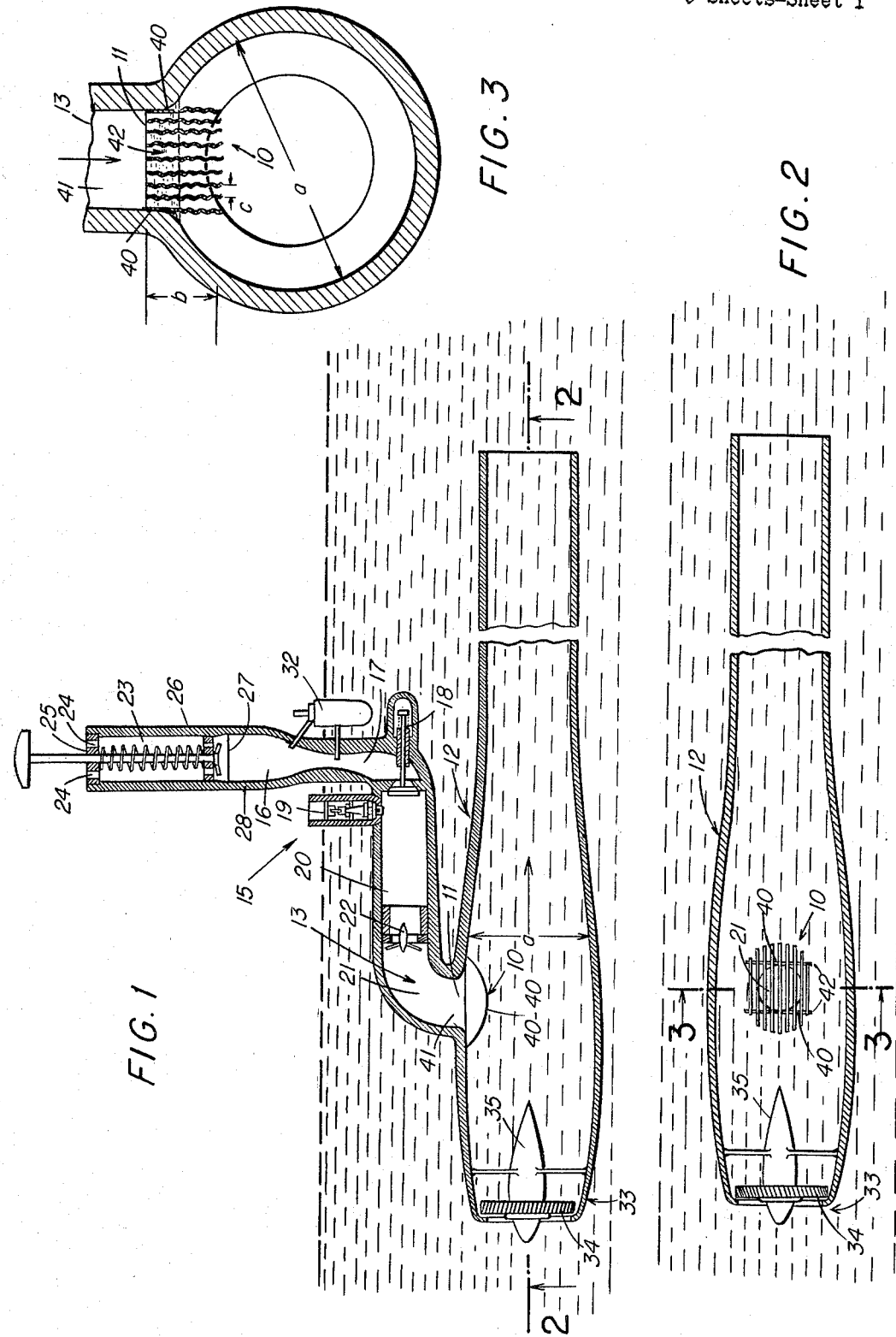

Oct. 18, 1966 M. KEMENCZKY 3,279,178
HYDRODYNAMIC VALVE STRUCTURE
Filed April 16, 1963 3 Sheets-Sheet 2

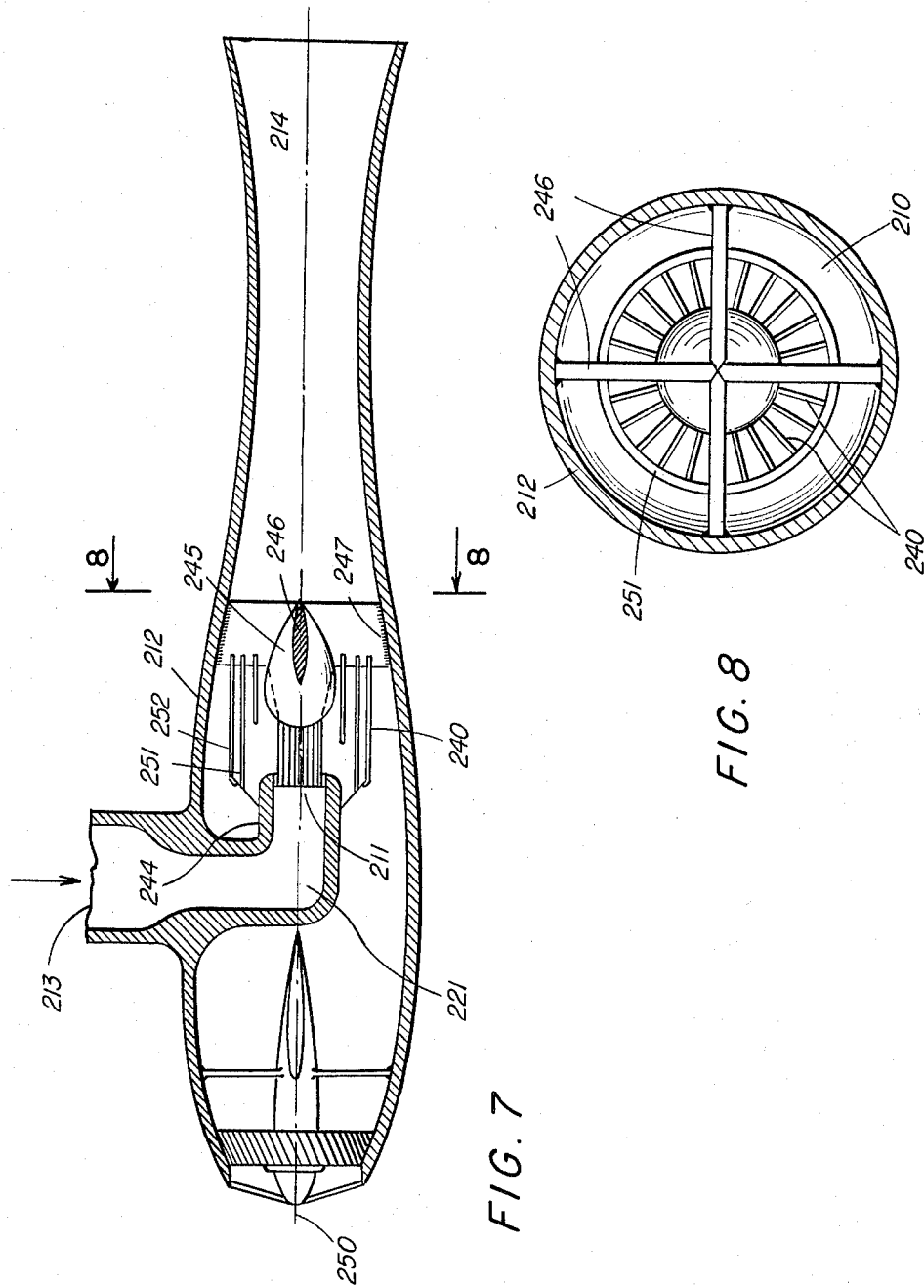

United States Patent Office 3,279,178
Patented Oct. 18, 1966

3,279,178
HYDRODYNAMIC VALVE STRUCTURE
Miklos Kemenczky, Maquoketa, Iowa, assignor to
Kemenczky Establishment, Vaduz, Liechtenstein
Filed Apr. 16, 1963, Ser. No. 273,335
4 Claims. (Cl. 60—221)

This invention relates to improved hydrodynamic valve structures which may be used in devices such as jet propulsion engines for watercraft, air-hydropulse pumping devices and similar structures. More particularly, this invention relates to an improved hydrodynamic valve means for separating, or isolating, the combustion chamber from the thrust tube of a jet engine during the pre-ignition period of the engine cycle.

The devices to which this invention relates are used in jet-propulsion engines of type similar to that described in my United States Patent 3,060,682, for jet propulsion engine for watercraft, which issued on October 30, 1962. In these engines the charge consisting of a mixture of air and an easily combustible fuel, is drawn into a combustion chamber and ignited therein. The rapidly expanding combustion gases then pass through a series of compartments in the combustion chamber, through an impulse orifice, into a thrust tube. The thrust tube has an inlet opening for liquids forward of the impulse orifice and a discharge opening at the rear of the thrust tube aft of the impulse orifice. The rapidly expanding combustion gases being driven out of the combustion chamber act upon the column of water within the thrust tube ejecting it rearwardly thereby producing a jet-thrust reaction. This jet-thrust can be utilized either to propel the jet motor forwardly through a liquid medium, such as water or to pump a liquid, such as water, oil, acid, etc. rearwardly through the thrust tube.

It has been found advisable to place a closure valve at the orifice of the combustion chamber leading into the thrust tube. Such a valve serves to separate the gases in the combustion chamber from the liquid in the thrust tube during the part of the cycle immediately preceding ignition of the combustible gases due to the suction produced by the liquid in the thrust tube rushing past the face of the orifice. Furthermore, such a valve serves as a barrier to hold back the gases in the combustion chamber, thereby increasing the compression of the gases and the efficiency of the combustion. A closure valve also serves to prevent wetting or quenching of the spark plug or other combusting means. However, moveable valve closure means have been of a mechanical type, i.e. flap valves. Mechanical valves have the disadvantage of introducing an added resistance due to their mechanical function. They also create turbulence at the impulse orifice between the combustion chamber and the thrust tube and can prevent adequate scavenging of combusted gases from the combustion chamber. Furthermore, such mechanical valves have been found to open at relatively low chamber pressures, thereby permitting unburned gases to leave the combustion chamber and to mix with the liquid in the thrust tube. This results in poor combustion efficiency, as well as in a considerable loss of fuel.

At high cyclic operating speeds such closure valves must open and close at a very rapid rate. Especially since these valves are at the interphase between the liquid in the thrust tube and the hot expanding gases in the combustion chamber, movable valve structures at this orifice are subject to excessive wear, oxidative corrosion, and distortion which adversely affect their sealing qualities and their ease of operation. Moreover, since the diameter of the impulse orifice from the combustion chamber into the thrust tube must be relatively large to permit free and rapid exit of the expanding gases, movable valves at the orifice must also be large. Very rapid opening and closing of such large valves create serious stresses, vibration, and wear of the moving parts. Such movable valve structures are therefore susceptible to mechanical breakdown, and have to be constructed from relatively heavy and bulky materials to be sufficiently strong to withstand operating conditions. The heavier the construction of the valve parts the greater is the turbulence and resistance which they introduce into the system.

A principal object of the present invention is to provide a closure means at the orifice of the combustion chamber opening into the thrust tube, which will offer minimal resistance to the expansion of combustion gases while providing an adequate seal against the inflow of water from the thrust tube. Another object of the present invention is to provide a valve which will cause a minimum of turbulence both in the "closed" and in the "open" position and which holds back the uncombusted gases for a sufficient length of time to compress the gases, and to effect their substantially complete combustion, before the combustion mixture is released into the thrust tube. A still further object of this invention is to introduce the combustion mixture into the thrust tube without creating turbulence in the liquid passing through the thrust tube. It has been found that in accordance with this invention, a hydrodynamic grid type vent performs these functions remarkably well. One distinct advantage of such a grid type vent is that it involves no moving parts, and therefore operates efficiently at all engine speeds. The grid type vent in accordance with this invention can operate at very high engine speeds without inducing objectionable vibrations or turbulence. Not having moving parts, the grid type vent is not subject to mechanical failure and is able to withstand the rapid temperature and pressure changes. A grid type vent in accordance with this invention is not subject to blockage by foreign matter but is "self-cleaning" at each explosive discharge of hot gases from the combustion chamber.

A further object of the present invention is to provide a grid type vent which can be readily and economically manufactured on a mass basis.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 1 is a sectional side elevational view illustrating an embodiment of the hydrodynamic valve structure of the present invention in a jet engine for watercraft;

FIG. 2 is a longitudinal section of the structure shown in FIG. 1 taken substantially along line 2—2 of FIG. 1;

FIG. 3 is a lateral section with parts broken away of the thrust tube and hydrodynamic valve structure of the FIG. 1 embodiment, taken substantially along line 3—3 of FIG. 2;

FIG. 7 is a sectional side elevational view of another embodiment of the hydrodynamic valve structure of the present invention in a thrust tube of a jet engine for watercraft; and FIG. 8 is a detailed lateral sectional view of the thrust tube and valve structure of the present invention taken substantially along line 8—8 of FIG. 7.

Figure 4:
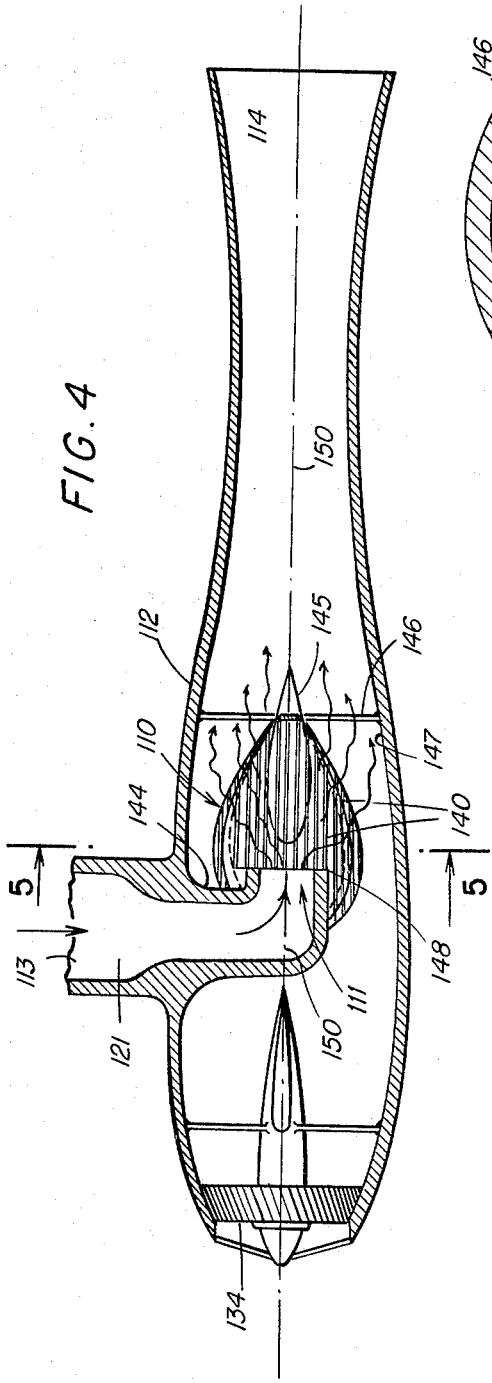
FIG. 4 is a sectional side elevational view of another embodiment of the hydrodynamic valve structure of the present invention in a thrust tube of a jet engine for watercraft.

Referring to the drawings in which like numerals identify similar parts throughout, it will be seen that, as illustrated in FIGS. 1 to 3 inclusive, one embodiment of the present invention can include a hydrodynamic valve structure or grid vent 10 located in exhaust orifice 11 between a thrust tube 12 and a combustion chamber 13 of a jet engine for watercraft 15. The jet engine 15 for watercraft is similar to the jet engine for watercraft which is shown and more fully described in my United States Patent 3,060,682.

As shown in FIG. 1, the jet engine 15 can have an air intake 16, a curburetor 17, a spring loaded combustion valve 18 through which the fuel mixture is drawn from the carburetor, and ignition means 19 for igniting the fuel mixture in combustion chamber 13. The combustion chamber 13 is preferably divided into at least two compartments, a first compartment 20 and a second compartment 21 which are separated by a one-way valve 22.

Combustion air flows to carburetor 17 through an air pump 23 by means of apertures 24, 24 in the end 25 of an air pump housing 26 and through a piston 27 which, when the engine is in operation, is in a stationary position. The housing 26 of this hand-operated, spring loaded, starting air pump 23 forms part of the intake pipe 28 for the combustion air. Gasoline or other fuel can be introduced into carburetor 17 through fuel float means 32.

At the forward end 33 of thrust tube 12 can be located a rotary check valve 34 movably mounted on hub 35 as more fully described in my United States Patent 3,060,682.

The hydrodynamic valve structure 10, as shown in detail in FIG. 3, can comprise a grid type vent having a series of longitudinal members or lamellae 40-40, which partially cover and can extend into the exhaust orifice 11 at the end portion 41 of the combustion chamber 13 leading into the thrust tube 12. These longitudinal members 40—40 preferably run parallel to the direction of liquid flow through the thrust tube 12 and to the direction of thrust of the exploding gases exiting from the combustion chamber 13 through the orifice 11. They can extend into the interior of the thrust tube 12, and if desired, can be recessed into the end portion 41 of the combustion chamber 13.

The proximity of the lamellae 40—40 to each other, their thickness, and their depth, will vary, depending on the density, the viscosity, and the pressure of the liquid in the thrust tube and the density, viscosity, and pressure of the gases in the combustion chamber, as well as the frequency of the firing cycle of the jet engine at operating speeds, the speed with which the liquid passes through the thrust tube at operating speeds, and the interior hydrodynamic shape of the thrust tube at the orifice 11. However, the dimensions of the grid lamellae 40—40 are such that they hold sufficient liquid from the thrust tube in the spaces between them so that the outflow of gases from the combustion chamber 13 is restricted for a sufficient time to permit the compression of the unburned gases, to provide maximum pressure of the burned gases and to assure complete combustion of the fuel. The liquid from the thrust tube 12 penetrates between the lamellae 40—40 of the grid vent 10 into the combustion chamber 13, and, at the moment of ignition of the fuel, forms a sealing "water curtain" in the grid vent. When the fuel in the combustion chamber 13 is ignited, the burning gases rapidly expand in the combustion chamber and blow the not yet burning fuel-air mixture into compartment 21, which is blocked at the exhaust orifice 11 by the "water curtain" which is present between the lamellae 40—40. The "water curtain" holds the mixture in compartment 21 for sufficient time such that it attains a maximum compression pressure. When the flame front advances from compartment 20 through back pressure valve 22 into compartment 21, the compressed mixture in compartment 21 is ignited and the pressure in compartment 21 is greatly increased, and the resulting hot gases expand and push the "water curtain" out of lamellae 40—40 and into thrust tube 12. However, the liquid forming the "water curtain" in the lamellae 40—40 should be of sufficient depth and thickness to require a short time lag during which the "water curtain" is blown out of the lamellae. This time lag should be of sufficient duration to permit the fuel mixture contained within the combustion chamber 13 to attain maximum explosive heat and pressure. The instant the maximum explosive pressure is obtained in the combustion chamber 13, the "water curtain" should be blown clear of the grid vent 10. The particular design characteristics of the grid vent 10 is of course dependent upon the structural configuration of the particular jet engine. The grid type valve 10 of this invention can, however, be effectively used with any jet engine or pump of the type described in my United States Patent 3,060,682, and similar devices. The designing of a grid type valve to fit the structural configuration of a particular jet engine in accordance with the herein described invention is within the scope of the general mechanical abilities of those skilled in the art.

Although the physical configuration of the grid type vent 10 will vary with the design and purpose of the jet engine, applicant has found that in jet propulsion engines for watercraft wherein the diameter (a) in FIG. 3, of the thrust tube 12 at a point just past, on the exhaust orifice side, of vent 10, is one to two inches, the depth (b) in FIG. 3, of the lamellae 40—40 can be about three-quarters of the diameters (a) and the lamellae of the grid type vent can each have a thickness of from 0.15 mm. to 0.2 mm. with the distance (c) between each adjacent lamellae being in a ratio of approximately $1/20$ to $1/40$ of the length (b) of the lamellae. It is to be understood that these ratios are merely illustrative of one embodiment of this invention.

The hydrodynamic grid type vent 10 of this invention may be constructed of stainless steel or any suitable strong metallic or non-metallic material which is capable of withstanding the rapid heat and pressure changes at the orifice of such a jet engine. It is preferred that the lamellae 40—40 do not have a smooth surface. As shown in FIG. 3, the lamellae 40—40 can have a somewhat corrugated or zig-zagged surface. The corrugation of lamellae 40—40 creates a greater amount of friction in the exhaust orifice and reduces the velocity of the water passing through the grid valve 10 which assists in creating the "water curtain," while not significantly increasing the resistance which they offer to the outflow of gases through the orifice 11. As above described the lamellae 40—40 preferably run parallel to the direction of liquid and gaseous flow, but the grid type valve of this invention may also incorporate some cross-members 42—42 to impart structural rigidity and to further reduce the velocity of liquid flow between the lamellae of the grid. Such cross-members 42—42 may be recessed so that they do not extend into the thrust tube to the same extent as those running parallel to fluid flow through the thrust lamellae.

Applicant's grid type vent 10 operates in the following manner. Prior to ignition of the explosive mixture in the combustion chamber 13 the lamellae 40—40 offer little resistance to liquid flow through the thrust tube 12. However, the velocity of liquid flow between the lamellae 40—40 of the grid type vent 10 is much less than it is in other portions of the thrust tube 12. The hydrostatic pressure of the liquid in the thrust tube 12 against the gases in the combustion chamber 13 is thereby increased and loss of combustion gases through "washing out" is greatly reduced. The liquid phase in the thrust tube 12 penetrates between the lamellae 40—40 of the grid type valve 10 to an extent depending upon the pressure differential between the liquid and the gases in the combustion chamber 13 and upon the velocity, viscosity, and density of the liquid. Prior to ignition of the combustible gases the liquid between the lamellae 40—40 of the grid type vent 10 effectively seal the orifice 11 and prevent the escape of compressed gases from the combustion chamber 13. Upon ignition of the fuel, the water between the lamellae 40—40 of the grid type vent 10 serves to contain the compressed and exploding gases within the combustion chamber 13 for a sufficient period of time to assure that the combustion is complete and that maximum pressure is achieved. After ignition, as soon as maximum pressure has been reached, the water is forced out by the exploding gases from between the lamellae 40—40 of the grid type vent 10 and the exploding gases expand into the combustion chamber 13 forcing a plug of water rearwardly down the thrust tube 12. Once the liquid has been forced from between the lamellae 40—40 of the grid type vent 10 there is substantially no resistance to the outflow of hot gases through the orifice 11 into the thrust tube 12. The reason that the grid type vent 10 of this invention can prevent the inflow of liquid into the combustion chamber 13 while offering substantially no resistance to the outflow of gases from the combustion chamber is a result of the difference in frictional resistance offered by the grid type vent to liquids and to gases due to their different densities and viscosities. Once the "water curtain" has been blown out from between the lamellae 40—40, gases can freely flow through the orifice 11, since the lamellae themselves offer very little resistance to the flow of gases.

As the expanding gases of combustion leave the combustion chamber 13 through the grid valve 10 of this invention, they impel a "piston" of liquid down the after portion of the thrust tube 12. Due to the inertia of the rapidly ejected "piston" of liquid down the thrust tube 12 a partial vacuum follows the compression stage of the cycle. This partial vacuum serves to scavenge the combustion chamber 13, draw in fresh fuel, and allow additional quantities of liquid to enter the forward end of the thrust tube 13 throught rotary check valve 34. During this portion of the engine cycle the grid valve 10 of this invention is fully open, offering essentially no resistance to the passage of gases therethrough. As soon as liquid from the forward portion reaches the grid type valve 10 at the impulse orifice 11 leading from the combustion chamber 13 into the thrust tube 12 the grid type valve is again sealed preventing the further escape of gases and assuring sufficient back pressure for complete and efficient compression and combustion of the gases during the next cycle.

Figure 5:
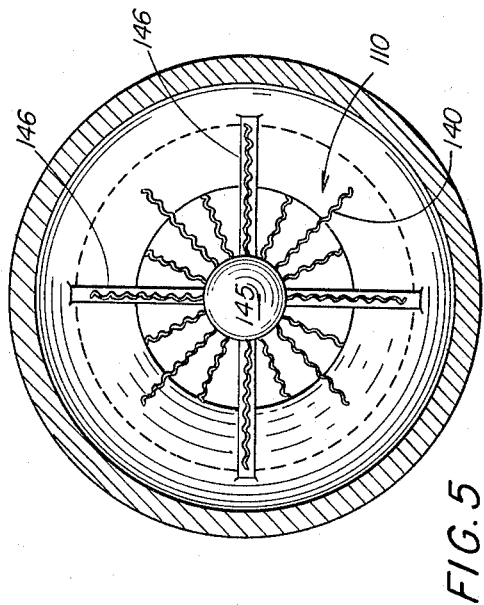
FIG. 5 is a detailed lateral sectional view of the thrust tube and valve structure of the present invention taken substantially along line 5—5 of FIG. 4.
Figure 6:
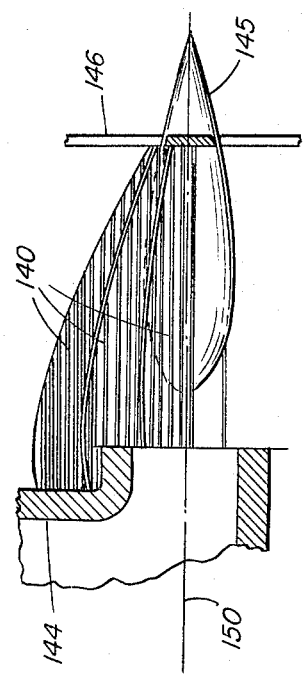
FIG. 6 is a detail of the sectional side elevational view the hydrodynamic valve structure of FIG. 4 with parts broken away.

Another embodiment of the present invention is shown in FIGS. 4 to 6 inclusive. In this embodiment parts which correspond to parts in the FIGS. 1 to 3 embodiment are identified by corresponding reference numerals, except that the numerals in the FIGS. 4 to 6 are increased by 100 over those applied in FIGS. 1 to 3.

In the FIG. 4 embodiment the parts which are forward of second compartment 121 of the combustion chamber 113 can be similar to those of the FIG. 1 embodiment and are not shown in FIG. 4. As shown in FIG. 4 the combustion chamber 113 extends downwardly into thrust tube 112 and has an impulse orifice 111 which is centrally disposed within thrust tube 112 and opens toward the rear 114 of the thrust tube. At the forward end of thrust tube 112 is a water inlet rotary check valve 134.

The hydrodynamic valve structure 110, as shown in detail in FIG. 6 is located at orifice 111 and comprises a series of radial lamellae 140—140 which can, if desired, be mounted between a baffle support 145 and the housing 144 of that portion of combustion chamber 113 which extends within thrust tube 112. Baffle support 145 can be mounted on brackets 146—146 which can be attached to the inside 147 of thrust tube 112. The baffle support 145 preferably has a streamline hydrodynamic shape which promotes in the distribution of the combustion blasts and decrease turbulence of the water passing the baffle support.

The radial lamellae 140—140, as shown in FIG. 5 do not necessarily cover the impulse orifice 111 but extend outwardly from the perimeter 148 of the orifice. However, the longitudinal center line 150 of the lamellae 140—140 should preferably approximately coincide with the longitudinal center line of orifice 110 and with the longitudinal center line of baffle support 145.

It is also preferable to have the center line 150 of orifice 111 approximately coincide with the longitudinal center line of thrust tube 112.

The radial lamellae 140—140 should have a corrugated or zig-zagged surface, similar to that described in the FIG. 1 embodiment and be constructed of stainless steel or other suitable material. As shown in FIG. 5, the depth of the lamellae 140—140 can be variable.

The valve structure 110 of the FIG. 4 embodiment operates similarly to that previously described for the FIG. 1 embodiment. When combustion occurs in chamber 113 the pressure from the burning gases blows the water out from between the lamellae 140—140 of valve structure 110 and forces a plug of water rearwardly down the thrust tube 112. As the gases cool and contract, water is drawn in through valve 134 and flows around valve structure 110 forming a water curtain at the time of ignition of the next charge.

Another embodiment of the present invention is shown in FIGS. 7 and 8. In this embodiment parts which correspond to the FIGS. 1 to 3 embodiment are identified by corresponding reference numerals except that the numerals in FIGS. 7 and 8 are increased by 200 over those applied to FIGS. 1 to 3.

In the FIG. 7 embodiment, the parts which are forward of second compartment 221 of the combustion chamber 213 can be similar to those of FIG. 1 and are not shown in FIG. 7. As shown in FIG. 7 the combustion chamber 213 extends downwardly into thrust tube 212 and has an impulse orifice 211 which is centrally disposed within thrust tube 212 and open toward the rear 214 of the thrust tube. At the forward end of the thrust tube 212 is a water inlet rotary check valve 234.

The hydrodynamic valve structure 210, as shown in FIGS. 7 and 8 is located at orifice 211 and comprises a series of radial lamellae 240—240 which are mounted between a baffle support 245 and the housing 244 of that portion of combustion chamber 213 which extends within thrust tube 212. Baffle support 245, which can be similar to baffle support 145 of FIG. 4, can be mounted on brackets 246—246 which can be attached to the inside 247 of thrust tube 212.

The radial lamellae 240—240 extend radially to the interior surface 251 of cylinder 252, which is preferably mounted with its axis along longitudinal center line 250. The center line 250 of cylinder 252 should preferably approximately coincide with the longitudinal center line of orifice 210 and of baffle support 245, as well as with the center line of thrust tube 212.

The radial lamellae 240—240 are shown here to be flat plates, but they can also be corrugated as are lamellae 140—140 in FIG. 4.

The grid type vent of this invention can be employed with various types of ignition systems and with various valve arrangements and/or arrangements of tubes in the thrust tube. For example it can be employed in the structures shown in my United States Patents Nos. 3,157,992 and 3,157,991, respectively.

The grid type vent in accordance with this invention may be used with jet powered pumps, as well as with jet motors for propulsion through water. Valves in accordance with this invention may be used irrespective of whether the particular jet engine uses one combustion chamber, a series of combustion chambers with one or more orifices leading into the thrust chamber, or one thrust chamber which is subdivided into several smaller compartments for increased compression. In fact, hydrodynamic valves in accordance with the teaching of this invention can be effectively used wherever it is desired to regulate the flow of two fluids, having substantially different densities and viscosities, as at a Y gate or similar point of junction into a common channel, on the basis of the pressure differential between the two fluids. Such valves will function to separate the two fluids in the same manner that the present valve separates the combustion mixture from the water.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

I claim:

1. In combination with a jet engine having a combustion chamber wherein a gaseous fluid is combusted, and a thrust tube which communicates with said combustion chamber at a junction defining an interface between the gaseous fluid in said combustion chamber and a liquid filling said thrust tube, a hydrodynamic valve structure sensitive to and operated by the pressure differential between said gaseous fluid and said liquid comprising a grid consisting of a series of longitudinal lamellae disposed at said interface, the lamellae forming passages into which the liquid may penetrate thereby to act as a valve sealant when the liquid is at a higher pressure than said gaseous fluid.

2. A combination in accordance with claim 1 wherein the lamellae are disposed parallel to the direction of flow of the liquid in the thrust tube.

3. A combination in accordance with claim 1 wherein the lamellae are spaced approximately equidistantly from each other and the distance therebetween is one-twentieth to one-fortieth of the depth of the lamellae.

4. A combination in acordance with claim 1 wherein the lamellae are of a corrugated structure.

References Cited by the Examiner

UNITED STATES PATENTS

| | | | |
|---|---|---|---|
| 706,600 | 8/1902 | Rush | 261—124 X |
| 773,784 | 11/1904 | Brunck | 261—124 X |
| 1,827,727 | 10/1931 | Blizard | 138—37 |
| 1,940,790 | 12/1933 | Diehl | 138—44 |
| 2,212,186 | 8/1940 | Ricardo | 138—40 X |
| 2,644,297 | 7/1953 | Coxe | 60—35.6 |
| 2,876,800 | 3/1959 | Kalff | 138—40 X |
| 2,946,345 | 7/1960 | Weltmer | 137—37 X |

WILLIAM F. O'DEA, *Primary Examiner.*

ISADOR WEIL, *Examiner.*

D. LAMBERT, *Assistant Examiner.*